(12) United States Patent
Karlson et al.

(10) Patent No.: US 8,244,757 B2
(45) Date of Patent: Aug. 14, 2012

(54) FACET-BASED INTERFACE FOR MOBILE SEARCH

(75) Inventors: Amy K. Karlson, Ellicott City, MD (US); George Robertson, Seattle, WA (US); Daniel C. Robbins, Seattle, WA (US); Mary Czerwinski, Woodinville, WA (US); Greg Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1204 days.

(21) Appl. No.: 11/395,896

(22) Filed: Mar. 30, 2006

(65) Prior Publication Data

US 2007/0233654 A1   Oct. 4, 2007

(51) Int. Cl.
G06F 7/00 (2006.01)
G06F 17/30 (2006.01)

(52) U.S. Cl. ........ 707/778; 707/797; 707/829; 707/956; 715/385; 715/840; 715/841

(58) Field of Classification Search .................. 715/840, 715/841, 835; 707/778, 797, 829, 956
See application file for complete search history.

(56) References Cited

U.S. PATENT DOCUMENTS

| 5,602,596 | A | * | 2/1997 | Claussen et al. ................ 725/37 |
| 6,016,142 | A | * | 1/2000 | Chang et al. ................ 715/763 |
| 6,288,708 | B1 | * | 9/2001 | Stringer ........................ 345/169 |
| 6,731,316 | B2 | * | 5/2004 | Herigstad et al. ............. 715/864 |
| 7,317,449 | B2 | * | 1/2008 | Robbins et al. ................ 345/169 |
| 7,340,763 | B1 | * | 3/2008 | Harris ............................ 725/81 |
| 7,536,323 | B2 | * | 5/2009 | Hsieh .......................... 705/26.62 |
| 7,844,594 | B1 | * | 11/2010 | Holt et al. ...................... 707/709 |
| 7,920,871 | B2 | * | 4/2011 | Okuda ........................ 455/456.1 |
| 2002/0126153 | A1 | * | 9/2002 | Withers et al. ................ 345/773 |
| 2003/0078054 | A1 | * | 4/2003 | Okuda ........................... 455/456 |
| 2004/0001105 | A1 | * | 1/2004 | Chew et al. ..................... 345/817 |
| 2004/0085360 | A1 | * | 5/2004 | Pratt et al. ...................... 345/773 |
| 2004/0095327 | A1 | * | 5/2004 | Lo .................................. 345/169 |
| 2006/0048070 | A1 | * | 3/2006 | Taylor et al. ................... 715/773 |
| 2006/0248469 | A1 | * | 11/2006 | Czerwinski et al. .......... 715/764 |
| 2006/0265669 | A1 | * | 11/2006 | Lee ................................ 715/818 |
| 2007/0050393 | A1 | * | 3/2007 | Vogel et al. ................... 707/102 |
| 2007/0067305 | A1 | * | 3/2007 | Ives ................................ 707/10 |
| 2008/0049142 | A1 | * | 2/2008 | Schohn et al. ................. 348/569 |

FOREIGN PATENT DOCUMENTS

GB   PCT/GB04/04570   *   5/2005

OTHER PUBLICATIONS

"Fun With Faceted Browsing", IA summit, Feb. 28, 2004; http://user-experience.org/uefiles/facetedbrowse/KI-FunFacetedBrowse20040228.pdf.

* cited by examiner

Primary Examiner — Phong Nguyen

(57) ABSTRACT

Various technologies and techniques are disclosed that improve data searching on mobile devices. A facet-based search application is provided that has a filter region, a results region, a facet navigation region, and a menu region. A user applies a facet-based filter to a set of data by selecting a number on a keypad or other area that correlates spatially to a filter option in the facet navigation region. A set of data in the results region is updated based on the applied facet-based filter. The user can also apply a freeform text filter to the data by selecting one or more characters for which to search. The data displayed in the results region is updated based on the applied freeform text filter. When input is received from the user to save the applied filter, an attribute label is displayed as a query term in the filter region.

12 Claims, 19 Drawing Sheets

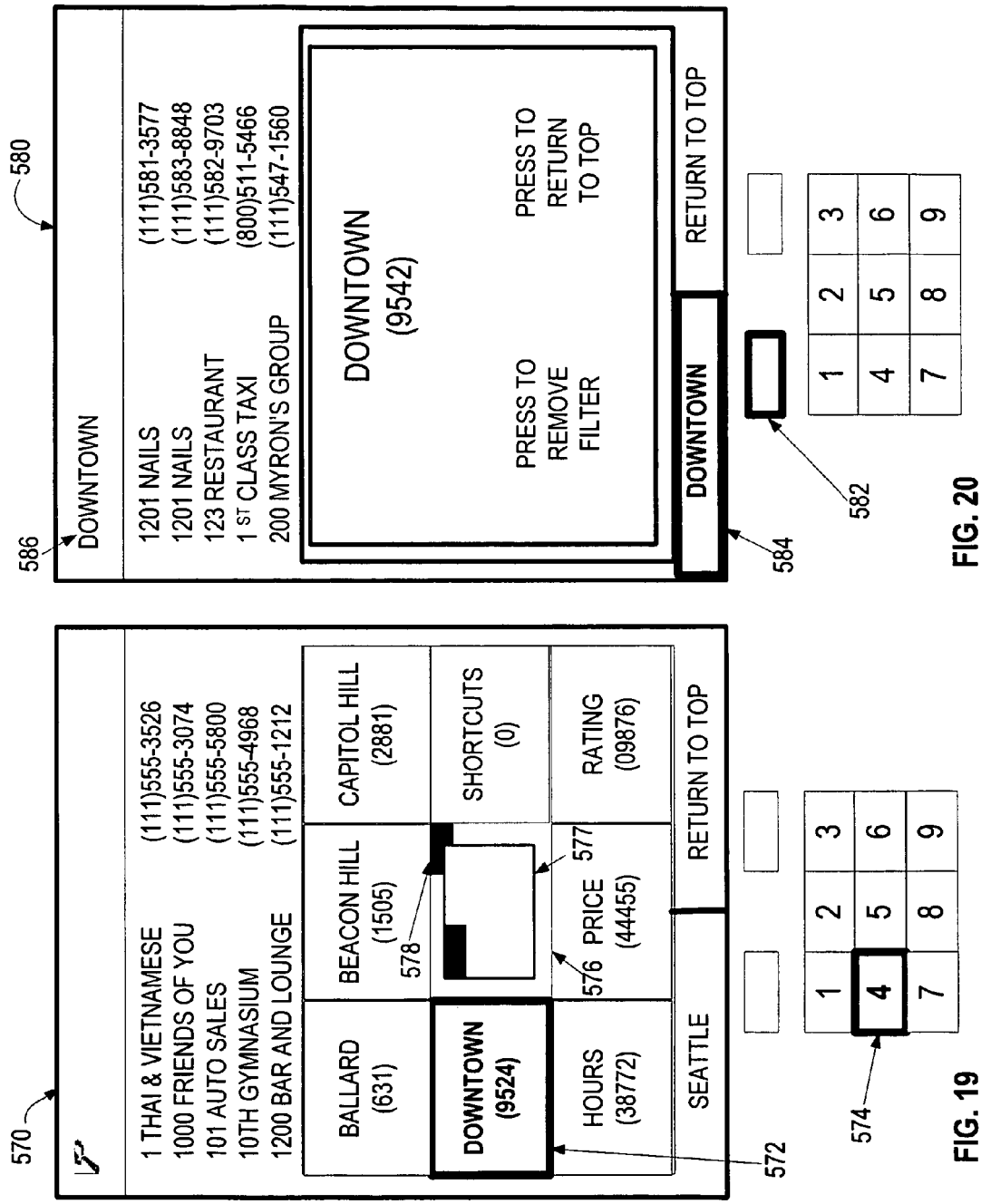

FACET-BASED INTERFACE FOR MOBILE SEARCH

BACKGROUND

Millions of mobile devices, such as mobile phones, are sold each year. As the mobile user base expands, so do device storage capacities and wireless services. Not only are these devices accumulating more device-resident data such as email, appointments and photos, but they are also increasingly used as front-end interfaces to ever-larger external data sets, including web sites, traffic information, and yellow pages data. Unprecedented volumes of data can be found in the pockets of users. At least a dozen simple message service (SMS) query-answer systems and web browser interfaces that target mobile platforms have debuted recently, and more are currently being developed.

As mobile devices continue to store and connect to these increasing volumes of data, the challenge becomes how to support users in finding information on devices with limited input and output capabilities. Small screens constrain the information that can be provided both during navigation and in the displayed results. Existing solutions cater to small screens and low bandwidth, but are modeled after desktop web search, posing three primary usability issues for the mobile setting. First, they rely on text entry as the method of input, even though the persistent trend toward smaller phones is directly at odds with the goal of achieving efficient text entry. Second, they focus on searching off the device, under-utilizing the device's processing power and storage capabilities. Finally, both the SMS and web search models support directed search tasks, but are less appropriate for browsing and exploratory search scenarios ("sense-making") that are quite complementary to the mobile setting (e.g., "What is fun to do and inexpensive around here?").

SUMMARY

Various technologies and techniques are disclosed that improve data searching on mobile devices. A facet-based search application is provided that has a filter region, a results region, a facet navigation region, and a menu region. A user applies a facet-based filter to a set of data by selecting a number on a keypad or other area that correlates spatially to a filter option in the facet navigation region. In one implementation, the facet navigation region is a three by three grid that corresponds to the numbers one to nine on a device's keypad. The user navigates through the data set by selecting the number on the keypad that corresponds to the area in the three by three grid that includes the desired filter option. A set of data in the results region is updated based on the applied facet-based filter. The user can also apply a freeform text filter to the data by selecting one or more characters for which to search. The data displayed in the results region is updated based on the applied freeform text filter.

Data is organized hierarchically, and each record can be reached by one or more of its attributes. When input is received from the user to save the applied filter, an attribute label is displayed as a query term in the filter region. An overview area in the facet navigation region provides a history of how the user navigated to the current set of data. In one implementation, by combining facet-based searching with freeform text searches when and if appropriate, a user can rapidly navigate a large set of data to a smaller desired set of data.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 19 is a simulated screen for one implementation of the system of FIG. 1 that illustrates selecting a number on a keypad that corresponds spatially with a downtown filter option displayed in the facet navigation area and showing a navigation history in an overview area.

FIG. 20 is a simulated screen for one implementation of the system of FIG. 1 that illustrates adding or removing a particular filter.

DETAILED DESCRIPTION

Figure 1:
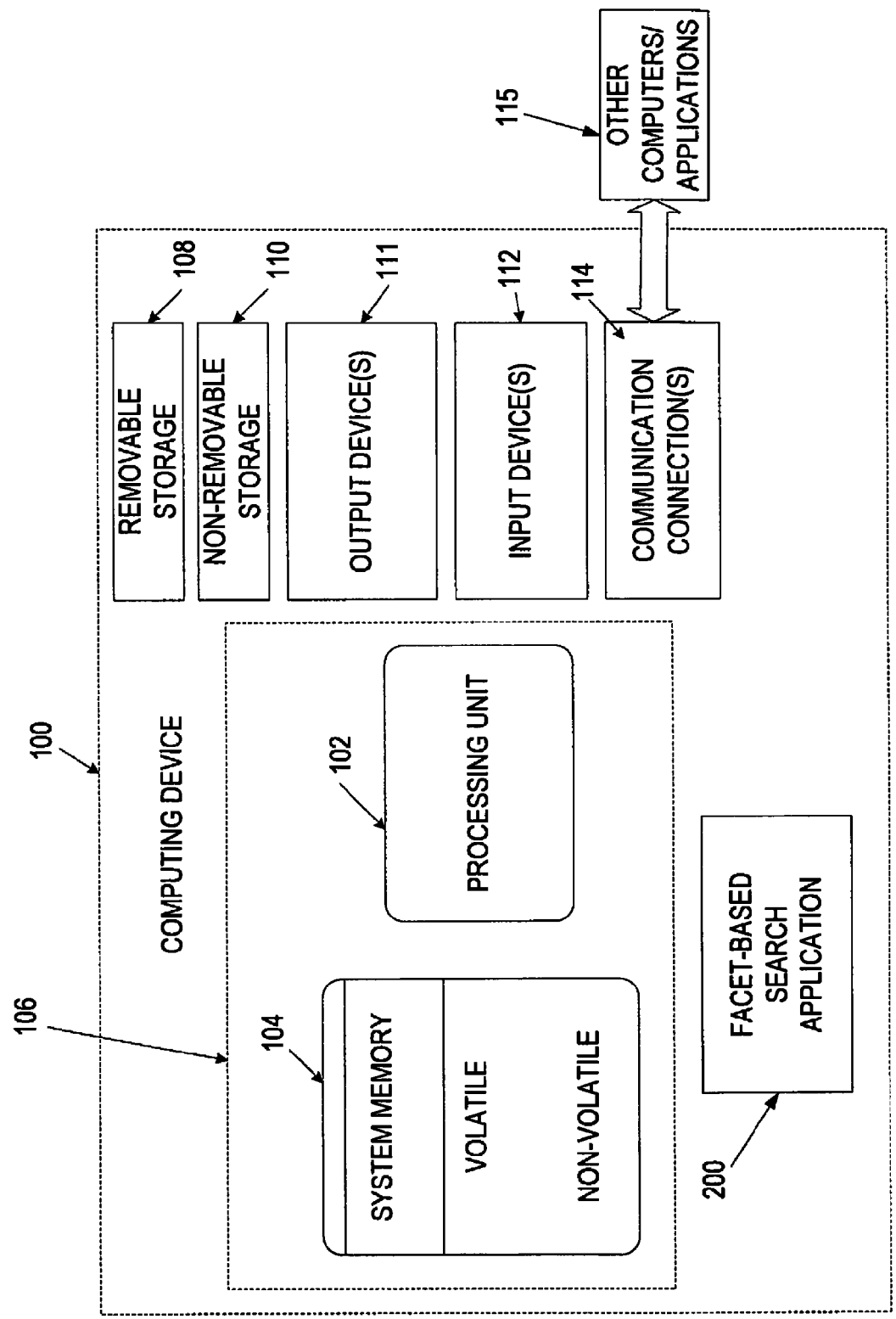
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves data searching on mobile devices, but the system also serves other purposes in addition to these. In one implementation, one or more of the techniques described herein can be implemented as features within any type of program or service that allows a user to search for information on or off the mobile device.

As shown in FIG. 1, an exemplary computer system to use for implementing one or more parts of the system includes a computing device, such as computing device 100. In one implementation, computing device is a mobile device such as a cellular phone, personal digital assistant (PDA), PDA phone, a handheld device, mini-laptop, or another mobile device. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

In one implementation, computing device 100 includes one or more communication connections 114 that allow computing device 100 to communicate with other computers and/or applications 115. Device 100 may also have input device(s) 112 such as a numeric keypad, stylus, keyboard, mouse, pen, voice input device, touch input device, etc. Output device(s) 111 such as a display, speakers, printer, etc. may also be included. These devices are well known in the art and need not be discussed at length here. Device 100 also includes a facet-based search application 200, which will be described in further detail with respect to FIG. 2.

Figure 2:
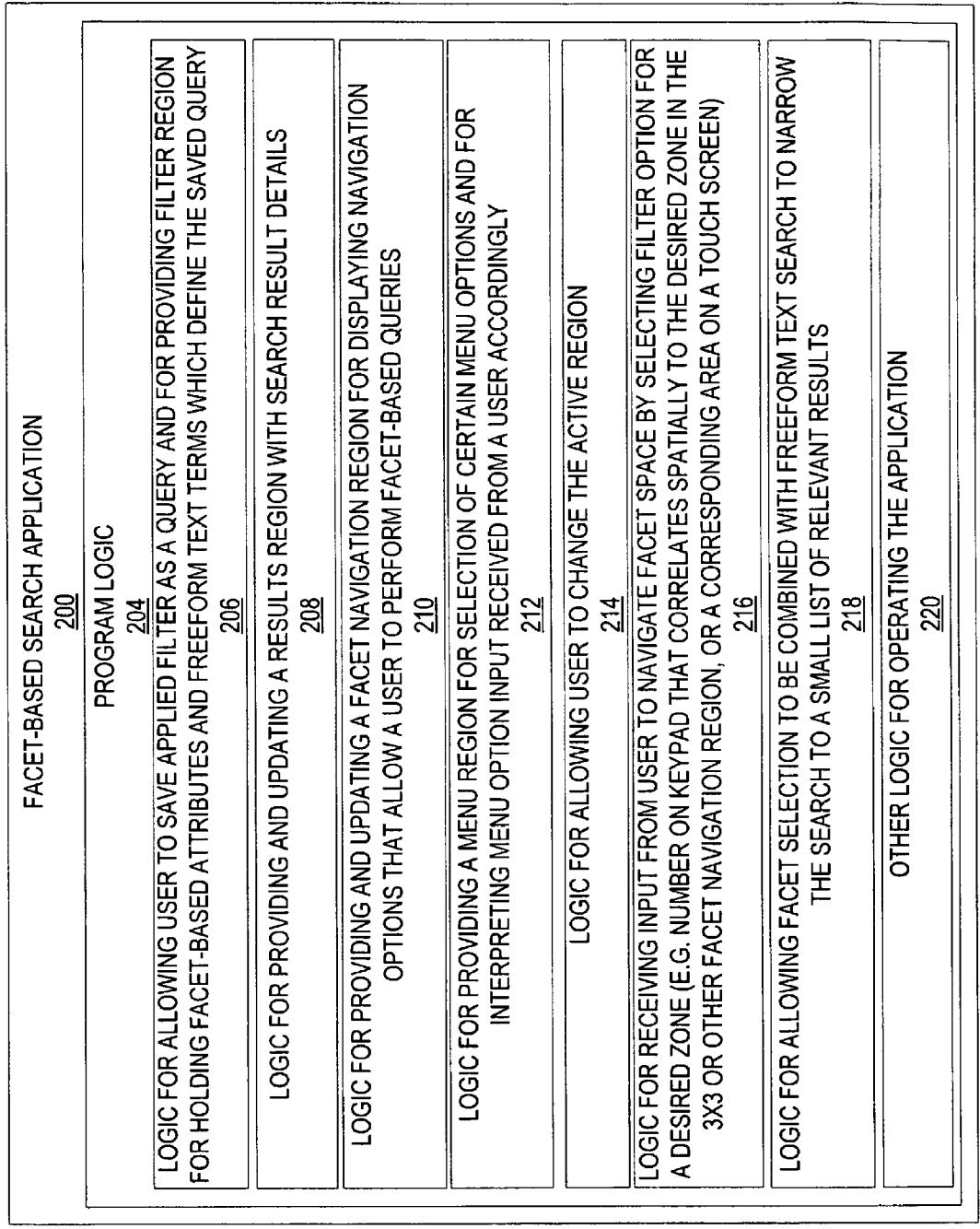
FIG. 2 is a diagrammatic view of a facet-based search application of one implementation operating on the computer system of FIG. 1.

Turning now to FIG. 2 with continued reference to FIG. 1, a facet-based search application 200 operating on computing device 100 is illustrated. Facet-based search application 200 is one of the application programs that reside on computing device 100. However, it will be understood that facet-based search application 200 can alternatively or additionally be embodied as computer-executable instructions on one or more computers and/or in different variations than shown on FIG. 2. Alternatively or additionally, one or more parts of facet-based search application 200 can be part of system memory 104, on other computers and/or applications 115, or other such variations as would occur to one in the computer software art.

Facet-based search application 200 includes program logic 204, which is responsible for carrying out some or all of the techniques described herein. Program logic 204 includes logic for allowing the user to save an applied filter as a query and for providing a filter region for holding facet-based attributes and freeform text terms which define the saved query 206; logic for providing and updating a results region with search results details 208; logic for providing and updating a facet navigation region for displaying navigation options that allow a user to perform facet-based queries 210; logic for providing a menu region for selection of certain menu options and for interpreting menu option input received from a user accordingly 212; logic for allowing a user to change the active region 214; logic for receiving input from a user to navigate the facet space by selecting a filter option for a desired zone, such as number on a keypad that correlates spatially to the desired zone in the three by three grid or other facet navigation region, or a corresponding area on a touch screen 216; logic for allowing facet selection to be combined with freeform text search to narrow the search to a small list of relevant results 218; and other logic for operating the application 220. In one implementation, program logic 204 is operable to be called programmatically from another program, such as using a single call to a procedure in program logic 204.

The examples presented herein illustrate using these technologies and techniques with a facet-based search application on a mobile device in one implementation. However, as discussed previously, in other implementations these technologies and techniques are used with other systems for performing facet-based searches on devices with limited display and/or input device sizes and abilities.

Figure 3:
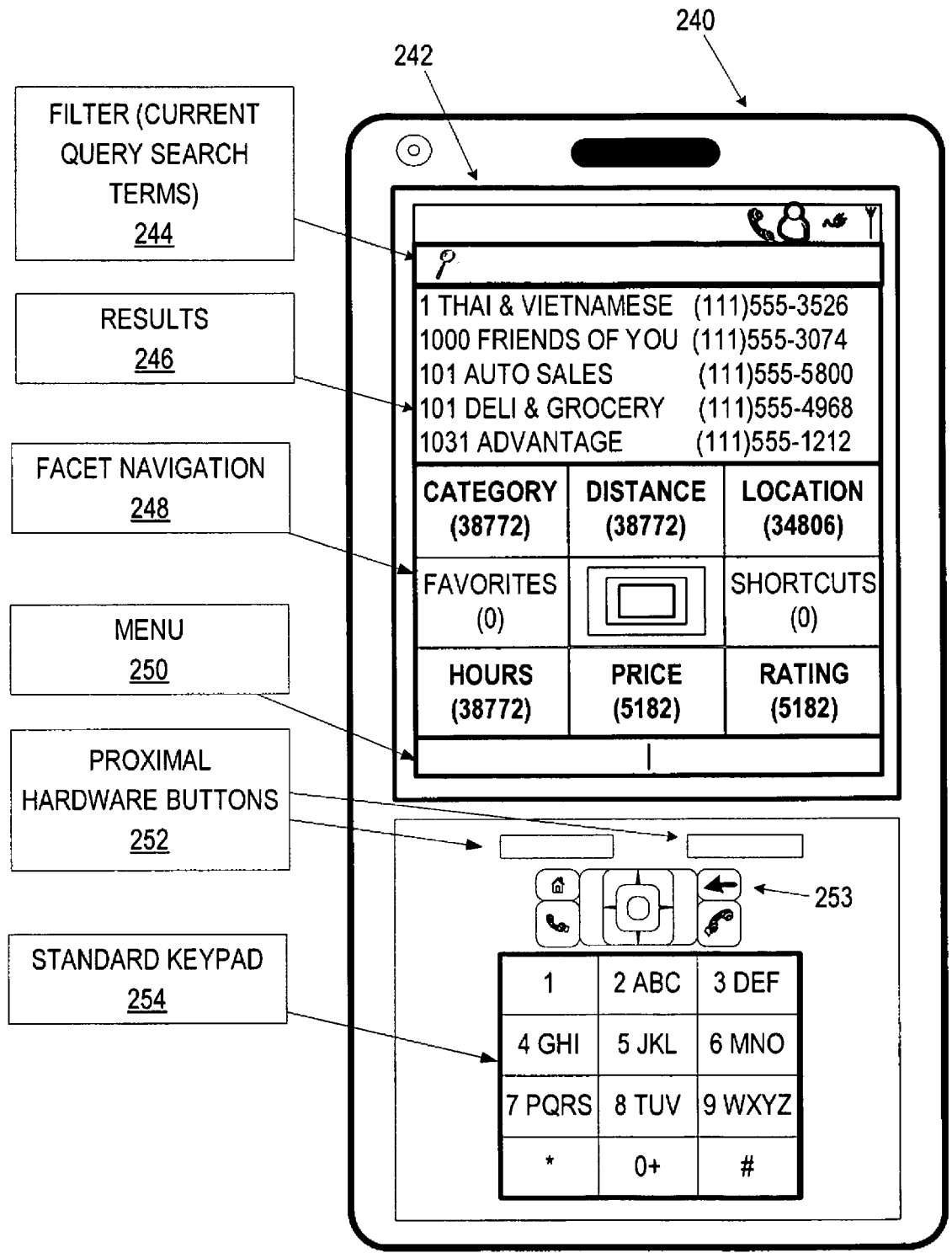
FIG. 3 is a simulated screen illustrating the various areas contained on a mobile device operating the facet-based search application of FIG. 2.

FIG. 3 is a simulated screen illustrating the various areas contained on a mobile device 240 operating the facet-based search application of FIG. 2. Mobile device 240 contains a display 242 with various regions. Filter region 244 displays the current query search terms. Results region 246 displays the set of data resulting from the current search. Facet navigation region 248 includes a grid of facet-based filters that a user can apply. Menu region 250 is used to display menu options that can be chosen by selecting the corresponding proximal hardware buttons 252. Back button 253 is used to navigate backwards in the search hierarchy.

In one implementation, facet navigation region 248 includes a three by three grid that corresponds spatially to the numbers 0 to 9 on standard keypad 254 on mobile device 240. Other variations and arrangements for facet navigation region 248 are also possible. The user navigates the facet space by selecting the corresponding number on the keypad 254. In another implementation, the user navigates the facet space by selecting the desired facet-based filter directly within the facet navigation region 248, such as when display 242 is touch-screen enabled. In other implementations, standard keypad 254 is not present at all and the desired facet-based filter is selected by another input means.

Figure 4:
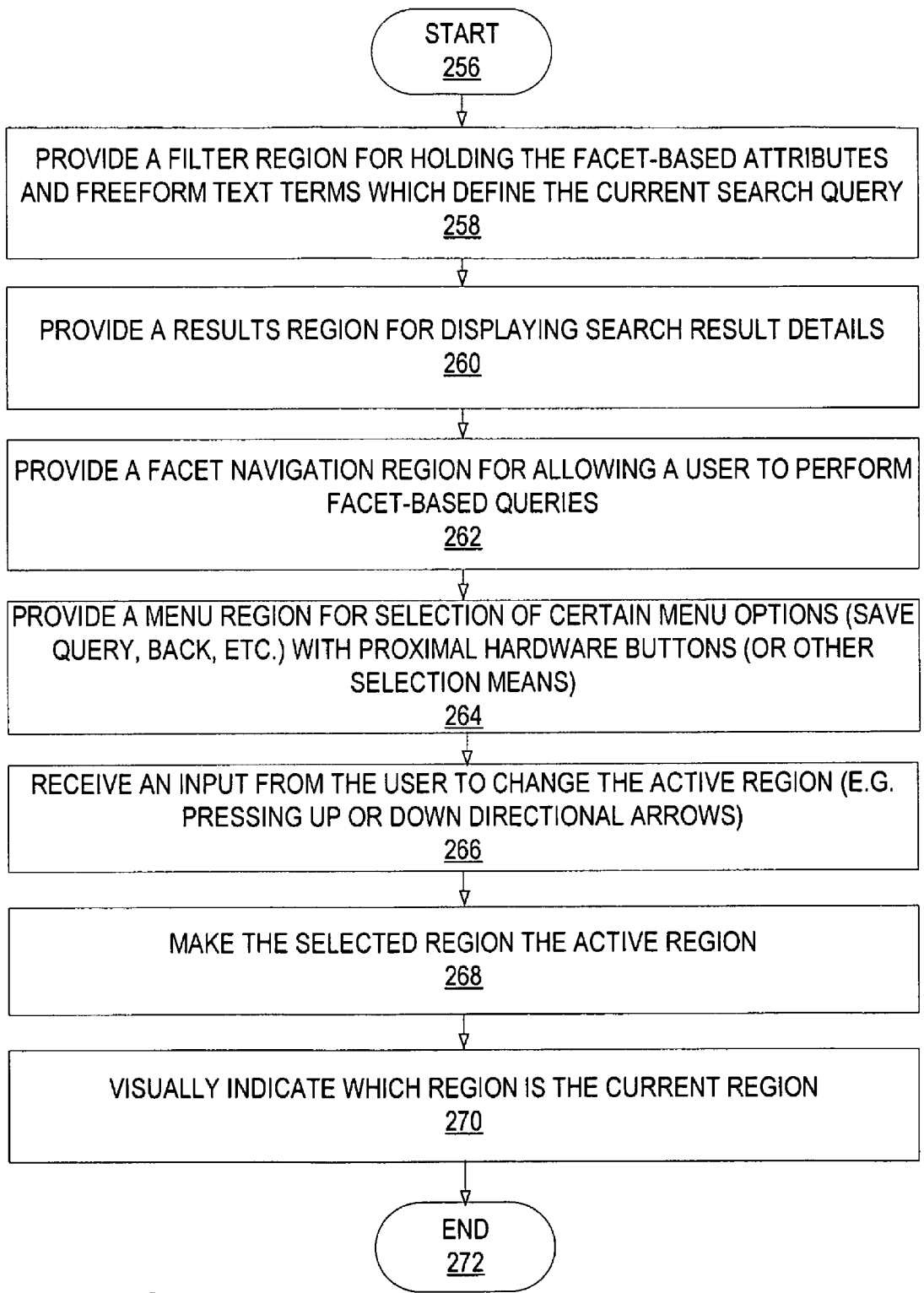
FIG. 4 is a process flow diagram for one implementation of the system of FIG. 1 illustrating some high level operations performed using the facet-based search application of FIG. 2.

Turning now to FIGS. 4-14 with continued reference to FIGS. 1-3, the stages for implementing one or more implementations of facet-based search application 200 are described in further detail. Some implementations of these stages are then illustrated in further detail using simulated screens in FIGS. 15-24. It will be appreciated that while specific buttons and navigation areas are described in some of these examples, numerous other buttons and/or navigation areas could also be used instead of or in addition to the ones described. Turning now to FIG. 4, a process flow diagram for one implementation of the system of FIG. 1 illustrates some high level operations performed using facet-based search application 200. In one form, the process of FIG. 4 is at least partially implemented in the operating logic of computing device 100.

The procedure begins at start point 256 with providing a filter region for holding the facet-based attributes and freeform text terms which define the current search query (stage 258). A results region is provided for displaying search result details (stage 260). A facet navigation region is provided for allowing a user to perform facet-based queries (stage 262). A menu region is provided for allowing a user to select certain menu options (save query, back, etc.) with proximal hardware buttons or another selection means (stage 264). When input is received from the user to change the active region (e.g. pressing up or down directional arrows) (stage 266), the system makes the selected region the active region (stage 268). The system visually indicates which region is the current region (stage 270). The process ends at end point 272.

Figure 5:
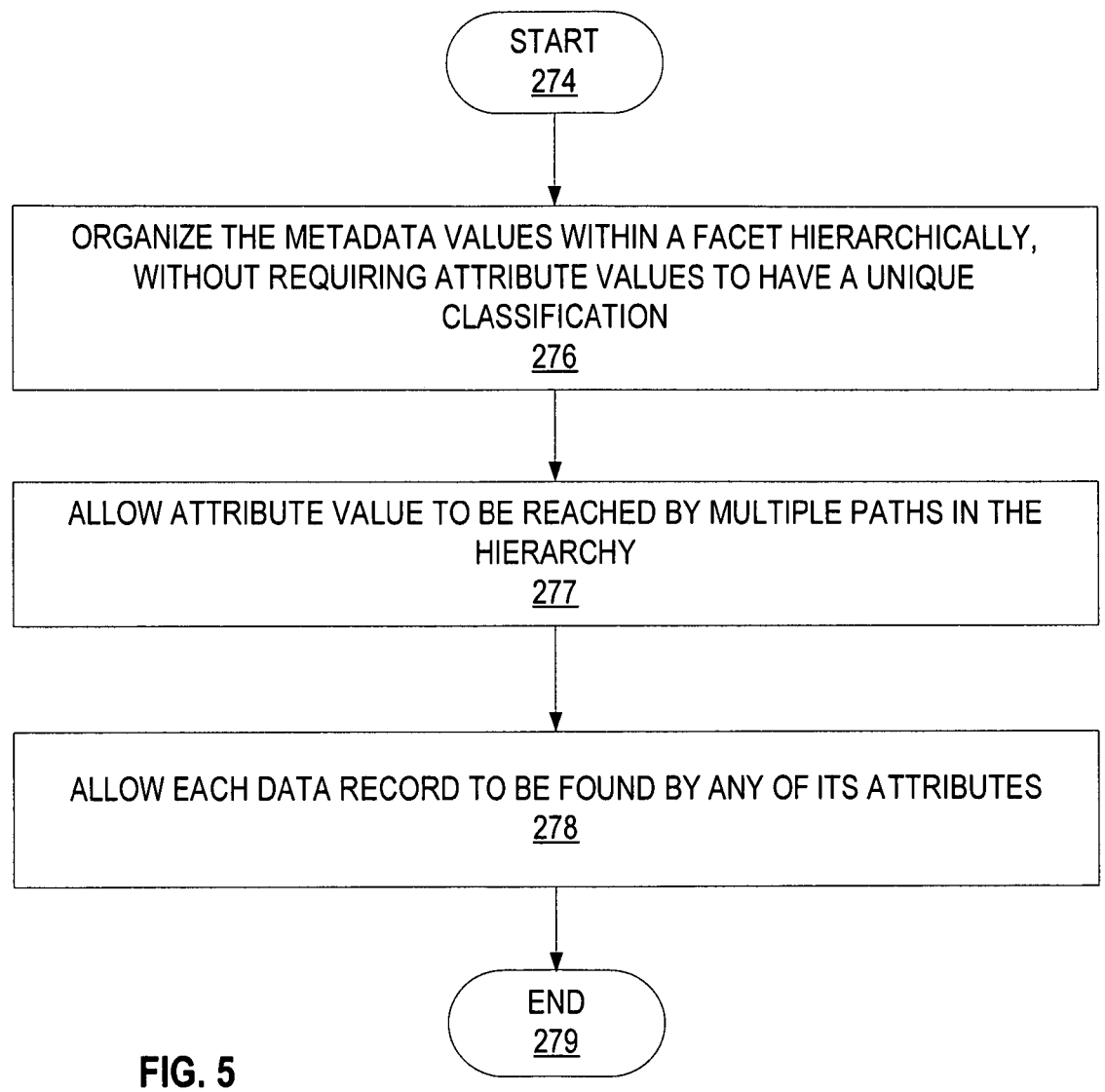
FIG. 5 is a process flow diagram for one implementation of the system of FIG. 1 illustrating the stages involved in organizing the data used within the facet-based search application.

FIG. 5 is a process flow diagram for one implementation of the system of FIG. 1 illustrating the stages involved in organizing the data used within the facet-based search application 200. In one form, the process of FIG. 5 is at least partially implemented in the operating logic of computing device 100. The procedure begins at start point 274 with organizing the metadata values within a facet hierarchically, without requiring attribute values to have a unique classification (stage 276). Attribute values can be reached by multiple paths in the hierarchy (stage 277). This allows each data record to be found by any of its attributes (stage 278). The process ends at end point 279.

Figure 6:
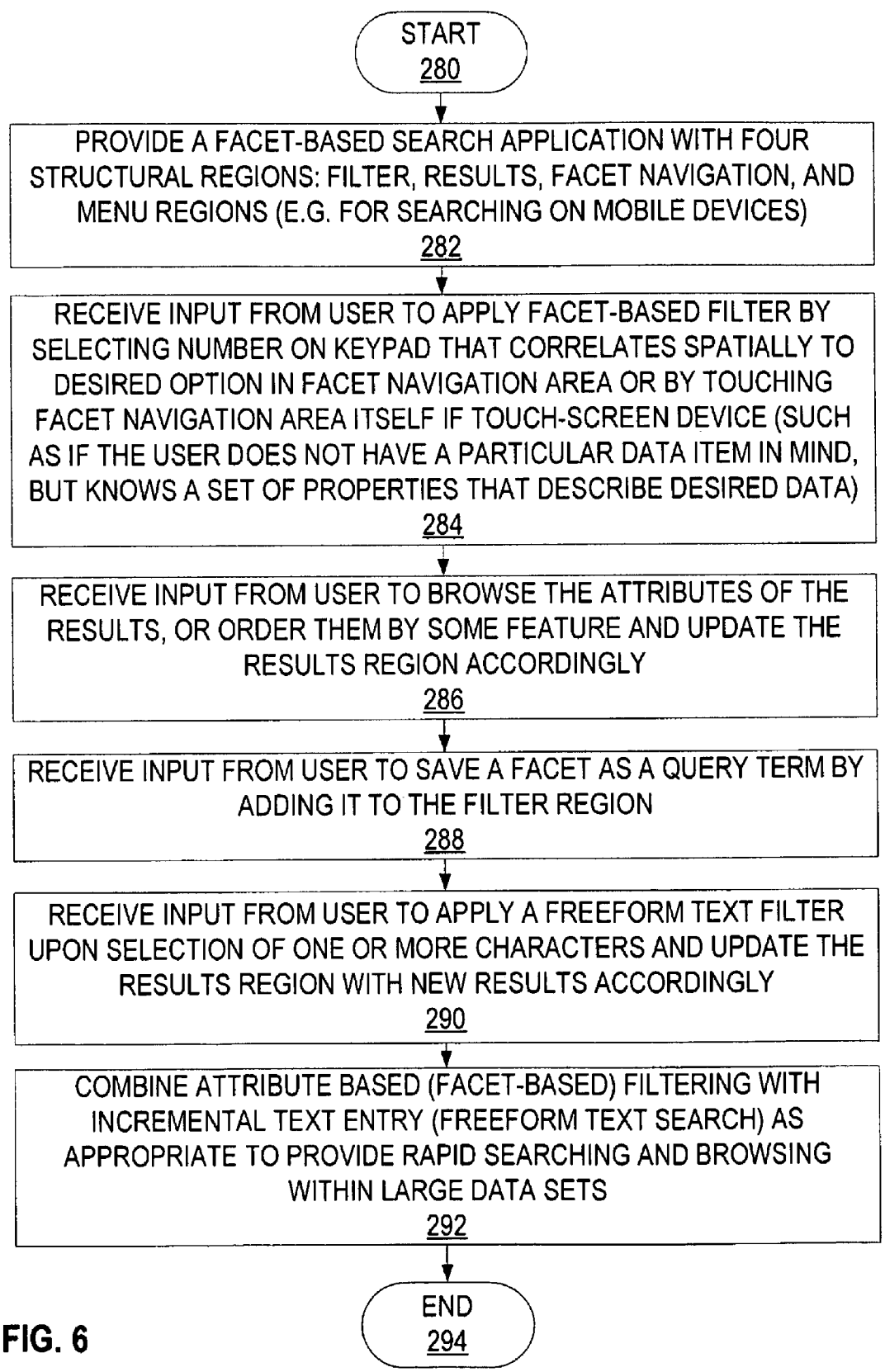
FIG. 6 is a process flow diagram for one implementation of the system of FIG. 1 illustrating the stages involved in allowing a user to perform searches using the facet-based search application.

FIG. 6 is a process flow diagram for one implementation of the system of FIG. 1 illustrating the stages involved in allowing a user to perform searches using the facet-based search application. In one form, the process of FIG. 6 is at least partially implemented in the operating logic of computing device 100. The procedure begins at start point 280 with providing a facet-based search application 200 with four structural regions: a filter region 244, a results region 246, a facet navigation region 248, and a menu region 250 (stage 282). In one implementation, the facet-based search application 200 is used for performing searches on mobile devices. Input is received from a user to apply a facet-based filter by selecting a number on a keypad that correlates spatially to the desired option in the facet navigation area, or by touching the facet navigation area itself if the device has a touch screen (stage 284). Facet-based filters can be used, for example, if the user does not have a particular data item in mind, but knows a set of properties that describe the desired data.

The system can receive input from the user to browse the attributes of the results, or to order them by some feature (stage 286). The results region is updated accordingly based on the selection (stage 286). The system can receive input from the user to save an attribute value as a query term by adding the value to the filter region (stage 288). The system can receive input from a user to apply a freeform text filter by selecting one or more characters, and then updates the results region with the new results accordingly (stage 290). In one implementation, by combining attribute based filtering (facet-based filtering) with incremental text entry (freeform text searches), rapid searching and browsing within large data sets can be provided (stage 292). The process ends at end point 294.

Figure 7:
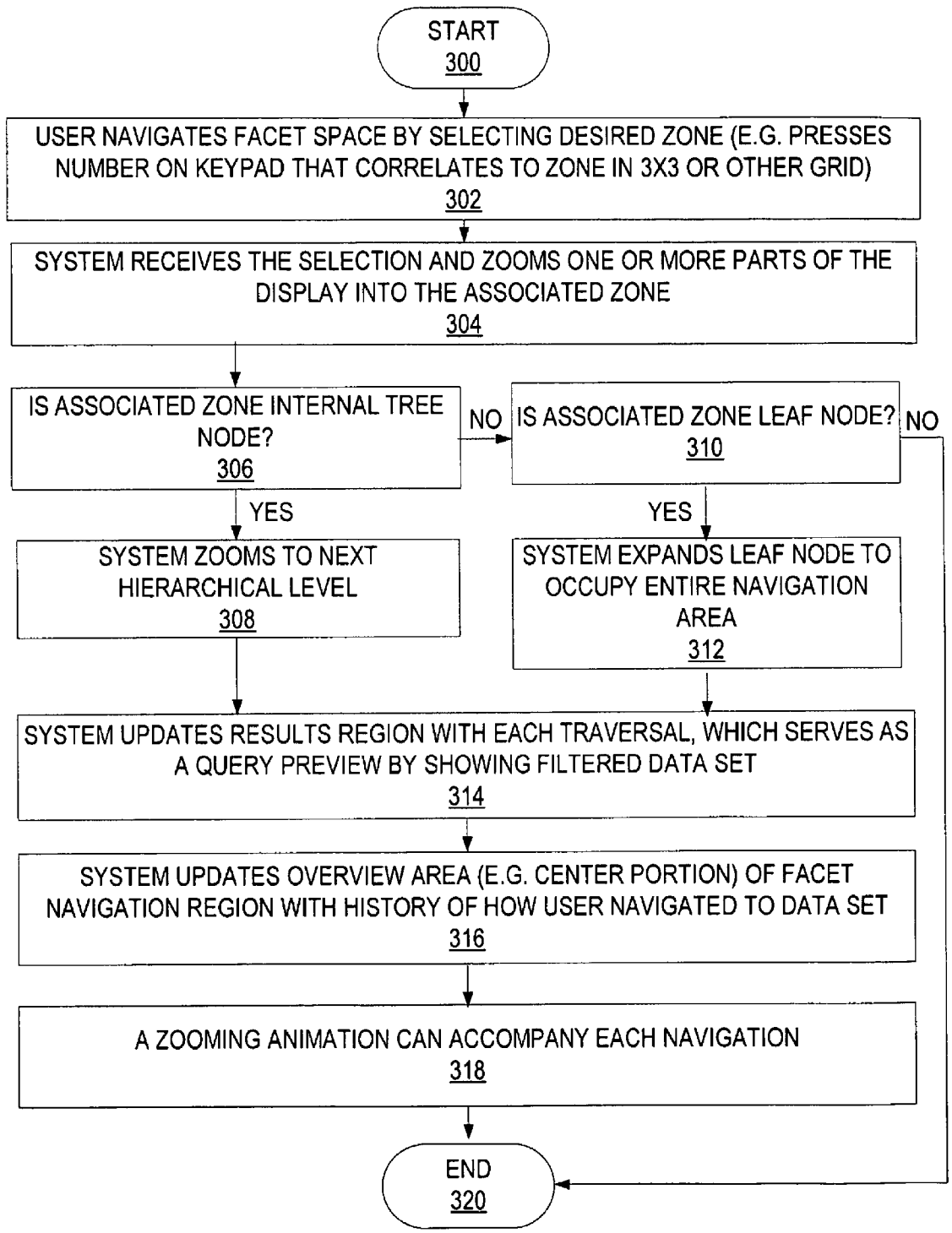
FIG. 7 is a process flow diagram for one implementation of the system of FIG. 1 illustrating the stages involved in zooming to the appropriate detail level based on the level of the search.

FIG. 7 is a process flow diagram for one implementation of the system of FIG. 1 illustrating the stages involved in zooming to the appropriate detail level based on the level of the search. In one form, the process of FIG. 7 is at least partially implemented in the operating logic of computing device 100. The procedure begins at start point 300 with the user navigating the facet space by selecting a desired zone, such as by pressing a number on keypad 254 that correlates to the desired zone in the three by three grid or other facet navigation region representation (stage 302). The system receives the selection and zooms one or more parts of the display into the associated zone (stage 304).

If the associated zone is an internal tree node (decision point 306), then the system zooms to the next hierarchical level (stage 308). If the associated zone is a leaf node (decision point 310), then the system expands the leaf node to occupy the entire navigation area (stage 312). In either situation, the system updates the results region 246 with each traversal, which serves as a query preview by showing a filtered data set (stage 314). The system updates the overview area (e.g. center portion) of facet navigation region with a history of how the user navigated to particular data set (stage 316). Navigations can include a zooming animation (stage 318). The process ends at end point 320.

Figure 8:
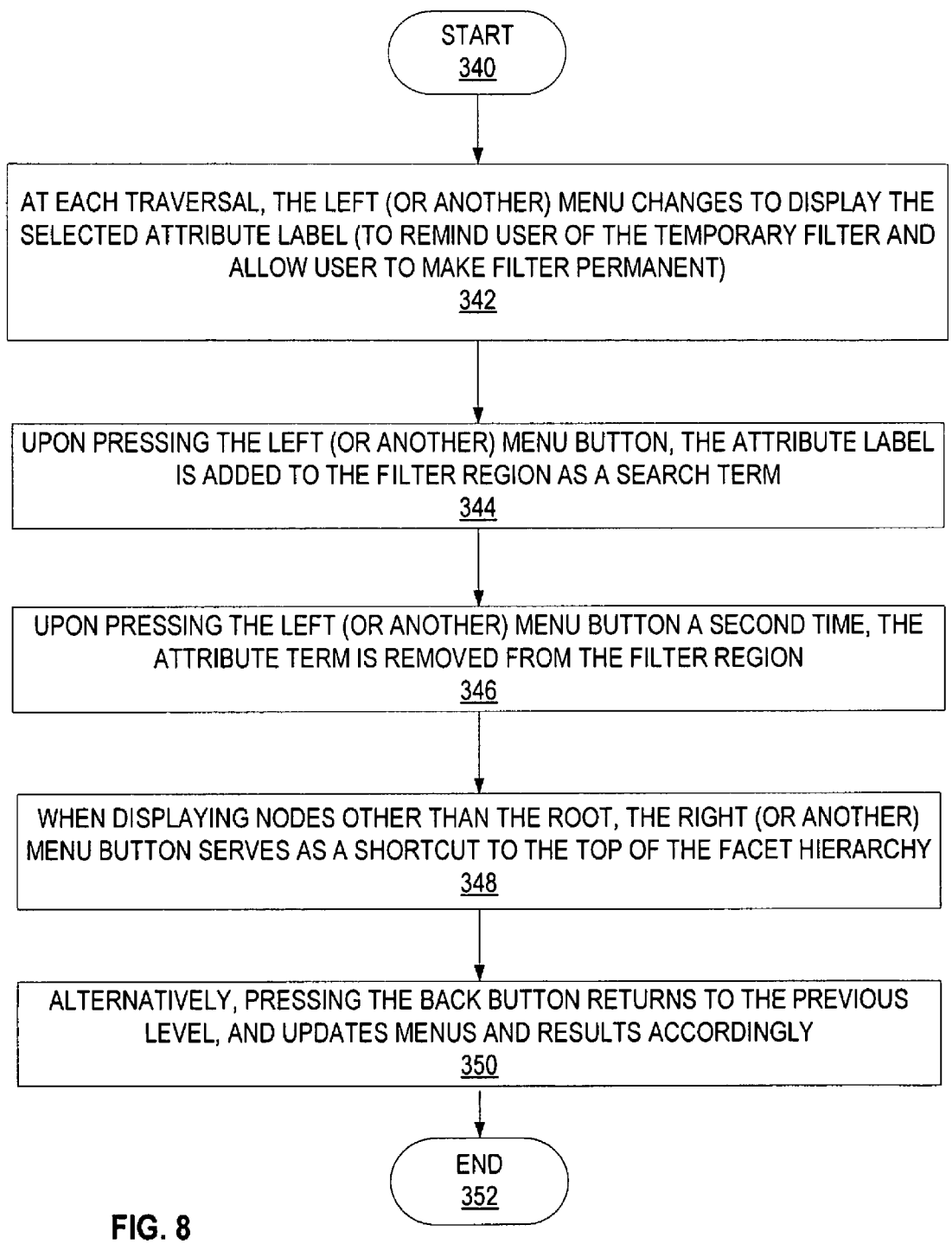
FIG. 8 is a process flow diagram for one implementation of the system of FIG. 1 illustrating the stages involved in using menu buttons to perform various features in the facet-based search application.

Turning now to FIG. 8, a process flow diagram for one implementation of the system of FIG. 1 illustrates the stages involved in using menu buttons to perform various features in the facet-based search application. In one form, the process of FIG. 8 is at least partially implemented in the operating logic of computing device 100. The procedure begins at start point 340 with the left (or another) menu 250 changing to display the selected attribute label at each traversal (stage 342). In one implementation, the menu 250 changes to remind the user of the temporary filter represented by the attribute label and allow the user to make the filter permanent (stage 342). Upon pressing the left (or another) menu button 252, the attribute label shown in menu 250 is added to the filter region 244 as a search term (stage 344). Upon pressing the left (or another) menu button 252 a second time, the attribute term is removed from the filter region 244 (stage 346). When displaying nodes other than the root, the right (or another) menu button 252 serves as a shortcut to the top of the facet hierarchy (stage 348). Alternatively, pressing the back button 253 returns to the previous level, and updates menus and results accordingly (stage 350). The process ends at end point 352.

Figure 9:
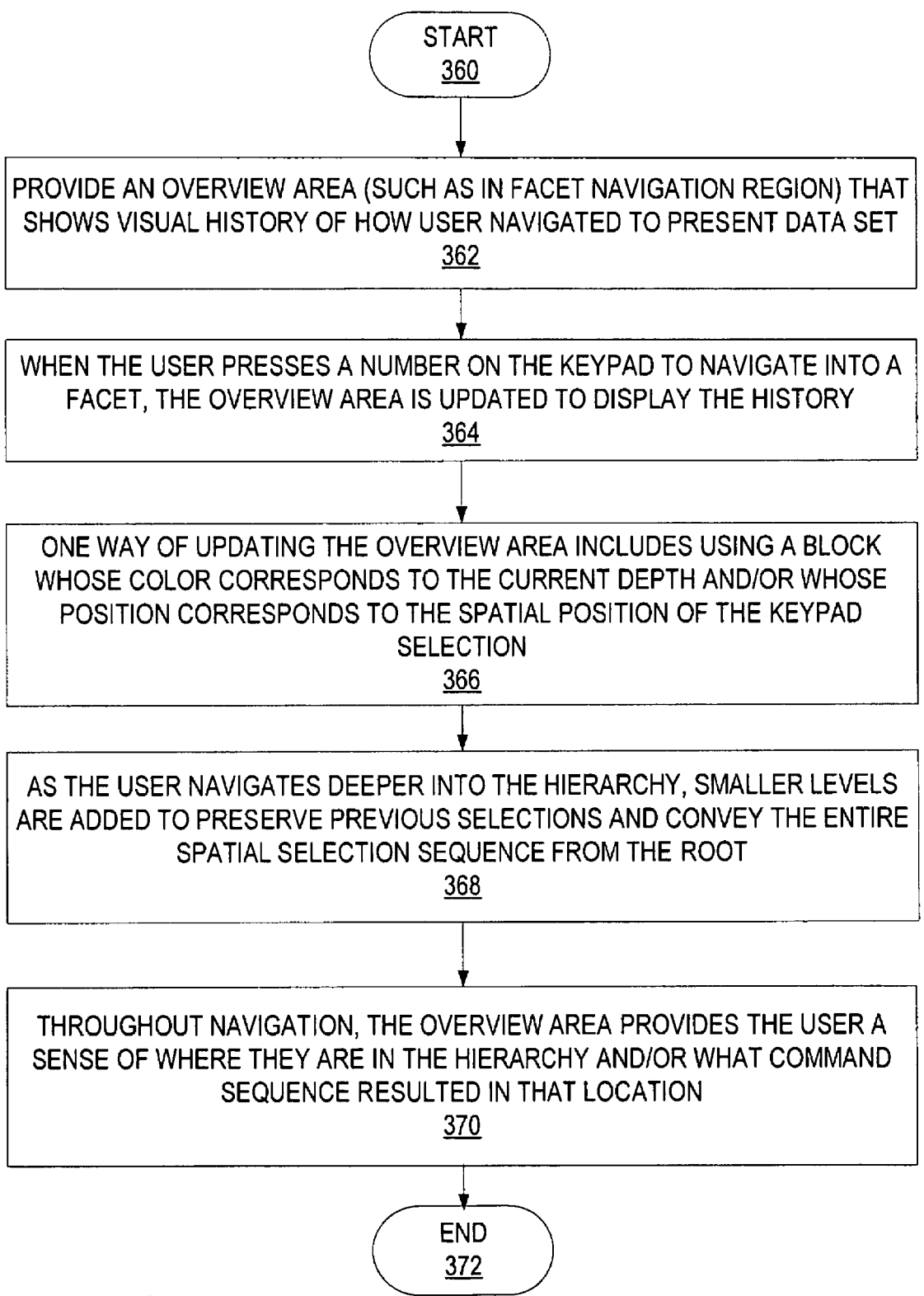
FIG. 9 is a process flow diagram for one implementation of the system of FIG. 1 illustrating the stages involved in updating an overview area with the history of how the user navigated to a particular data set.

FIG. 9 is a process flow diagram for one implementation of the system of FIG. 1 illustrating the stages involved in updating an overview area with the history of how the user navigated to a particular data set. In one form, the process of FIG. 9 is at least partially implemented in the operating logic of computing device 100. The procedure begins at start point 360 with providing an overview area (such as in facet navigation region) that shows visual history of how user navigated to present data set (stage 362). When the user presses a number on the keypad 254 to navigate into a facet, the overview area is updated to display the history (stage 364). One way of updating the overview area includes using a block whose color corresponds to the current depth and/or whose position corresponds to the spatial position of the keypad selection (stage 366). As the user navigates deeper into the hierarchy, smaller levels are added to preserve previous selections and convey the entire spatial selection sequence from the root (stage 368). Throughout navigation, the overview area provides the user with a sense of where they are in the hierarchy and/or what command sequence resulted in that location (stage 370). The process ends at end point 372.

Figure 10:
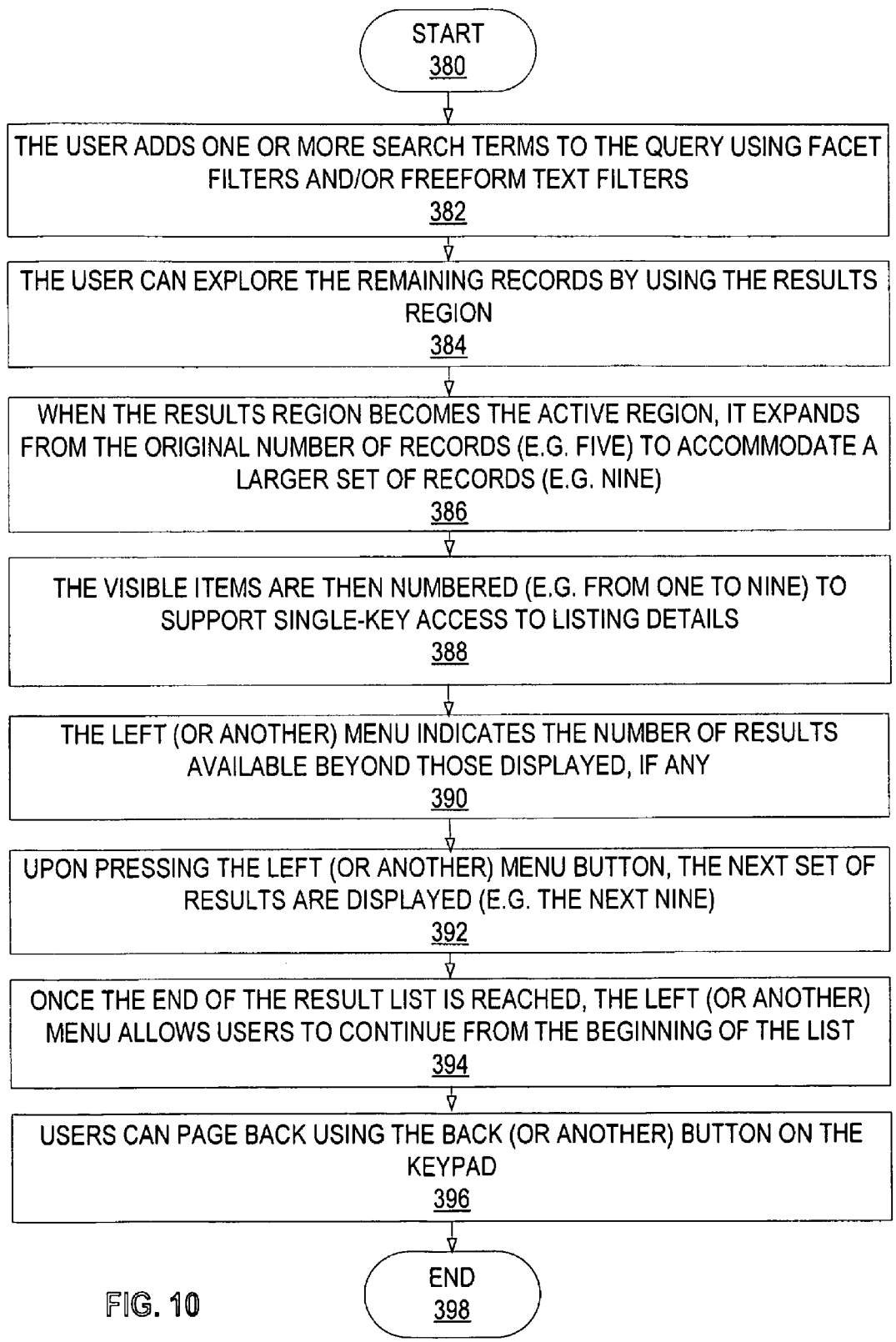
FIG. 10 is a process flow diagram for one implementation of the system of FIG. 1 illustrating the stages involved in navigating through a particular set of results in the facet-based search application.

FIG. 10 is a process flow diagram for one implementation of the system of FIG. 1 illustrating the stages involved in navigating through a particular set of results in the facet-based search application. In one form, the process of FIG. 10 is at least partially implemented in the operating logic of computing device 100. The procedure begins at start point 380 with the user adding one or more search terms to the query using facet-based filters and/or freeform text filters (stage 382). The user can explore the remaining records by using the results region 246 (stage 384). When the results region becomes the active region, it expands from the original number of records (e.g. five) to accommodate a larger set of records (e.g. nine) (stage 386). The visible items are then numbered (e.g. from one to nine) to support single-key access to listing details (stage 388). The left (or another) menu 250 indicates the number of results available beyond those displayed, if any (stage 390). Upon pressing the left (or another) menu button 252, the next set of results are displayed (e.g. the next nine) (stage 392). Once the end of the results list is reached, the left (or another) menu 250 allows users to continue from the beginning of the list (stage 394). Users can page back using the back (or another) button 253 on the keypad (stage 396). The process ends at end point 398.

Figure 11:
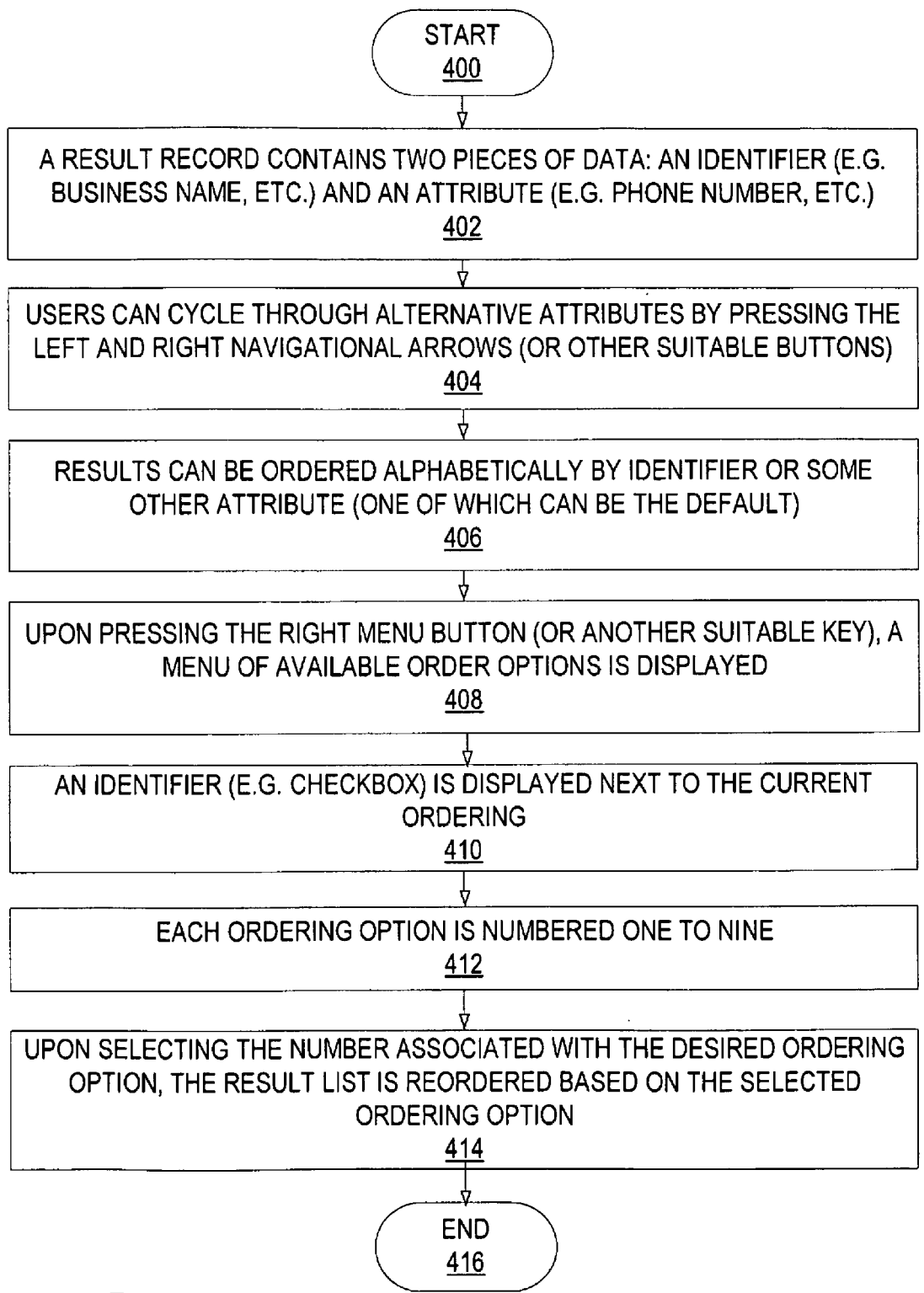
FIG. 11 is a process flow diagram for one implementation of the system of FIG. 1 illustrating the stages involved in changing the type of attributes displayed for the set of data displayed in the results region.

Turning now to FIG. 11, a process flow diagram for one implementation of the system of FIG. 1 illustrates the stages involved in changing the type of attributes displayed for the set of data displayed in the results region. In one form, the process of FIG. 11 is at least partially implemented in the operating logic of computing device 100. The procedure begins at start point 400 with a result record containing two pieces of data: an identifier (e.g. business name, etc.) and an attribute (e.g. phone number, etc.) (stage 402). Users can cycle through alternative attributes by pressing the left and right navigational arrows (or other suitable buttons) (stage 404). Results can be ordered alphabetically by identifier or some other attribute (one of which can be the default) (stage 406). Upon pressing the right menu button 252 (or another suitable key), a menu of available order options is displayed (stage 408). An identifier (e.g. checkbox) is displayed next to the current ordering (stage 410). Each ordering option is numbered one to nine (stage 412). Upon selecting the number associated with the desired ordering option or by otherwise selecting the desired ordering option, the result list is reordered based on the selected ordering option (stage 414). The process ends at end point 416.

Figure 12:
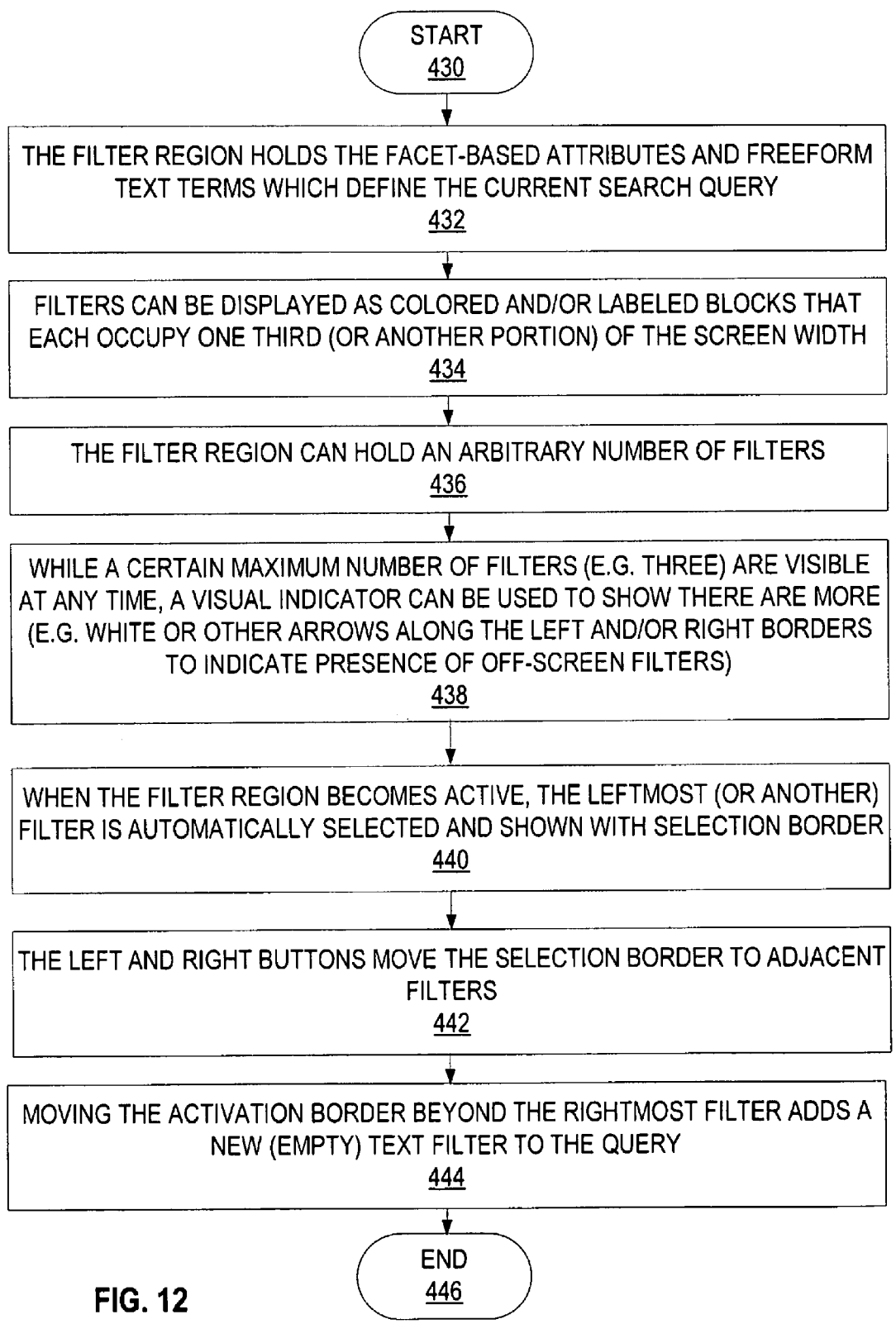
FIG. 12 is a process flow diagram for one implementation of the system of FIG. 1 illustrating the stages involved in interacting with the filter region.

FIG. 12 is a process flow diagram for one implementation of the system of FIG. 1 illustrating the stages involved in interacting with the filter region. In one form, the process of FIG. 12 is at least partially implemented in the operating logic of computing device 100. The procedure begins at start point 430 with the filter region 244 holding the facet-based attributes and freeform text terms which define the current search query (stage 432). Filters can be displayed as colored and/or labeled blocks that each occupy one third (or another portion) of the screen width (stage 434). The filter region 244 can hold an arbitrary number of filters (stage 436). While a certain maximum number of filters (e.g. three) are visible at any time, a visual indicator can be used to show there are more (e.g. white or other arrows along the left and/or right borders to indicate presence of off-screen filters) (stage 438). When the filter region 244 becomes active, the leftmost (or another) filter is automatically selected and shown with the selection border (stage 440). The left and right buttons move the selection border to adjacent filters (stage 442). Moving the activation border beyond the rightmost filter adds a new (empty) text filter to the query (stage 444). The process ends at end point 446.

Figure 13:
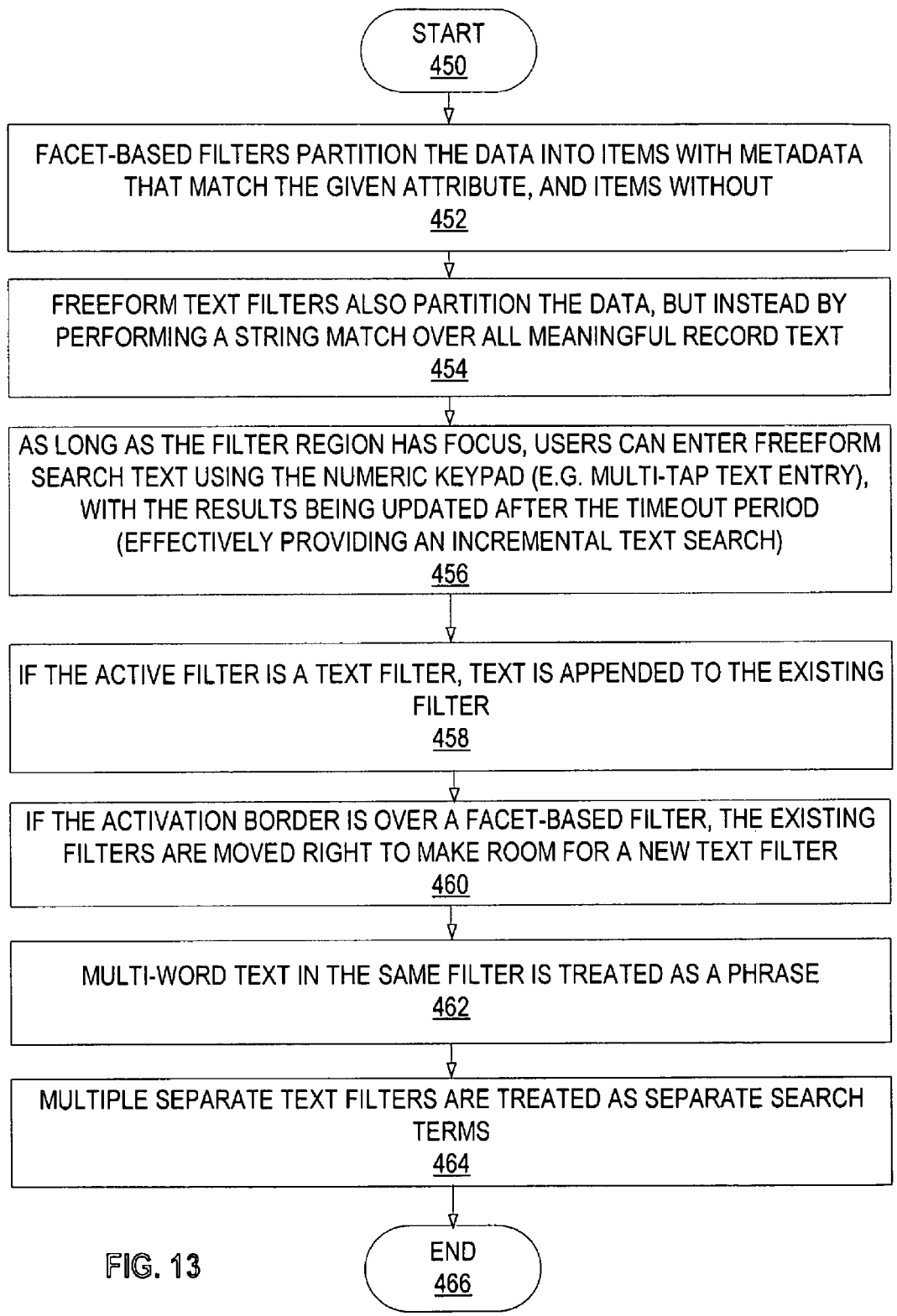
FIG. 13 is a process flow diagram for one implementation of the system of FIG. 1 illustrating the stages involved in performing freeform text searches using the facet-based search application.

FIG. 13 is a process flow diagram for one implementation of the system of FIG. 1 illustrating the stages involved in performing freeform text searches using the facet-based search application. In one form, the process of FIG. 13 is at least partially implemented in the operating logic of computing device 100. The procedure begins at start point 450 with facet-based filters partitioning the data into items with metadata that match the given attribute, and items without (stage 452). Freeform text filters also partition the data, but instead by performing a string match over all meaningful record text (stage 454). As long as the filter region 244 has the focus, users can enter freeform search text using the numeric keypad 254 (e.g. multi-tap text entry), with the results being updated after each character entry (effectively providing an incremental text search) (stage 456). If the active filter is a text filter, then text is appended to the existing filter (stage 458). If the activation border is over a facet-based filter, the existing filters are moved right to make room for a new text filter (stage 460). Multi-word text in the same filter is treated as a phrase (stage 462). Multiple separate text filters are treated as separate search terms (stage 464). The process ends at end point 466.

Figure 14:
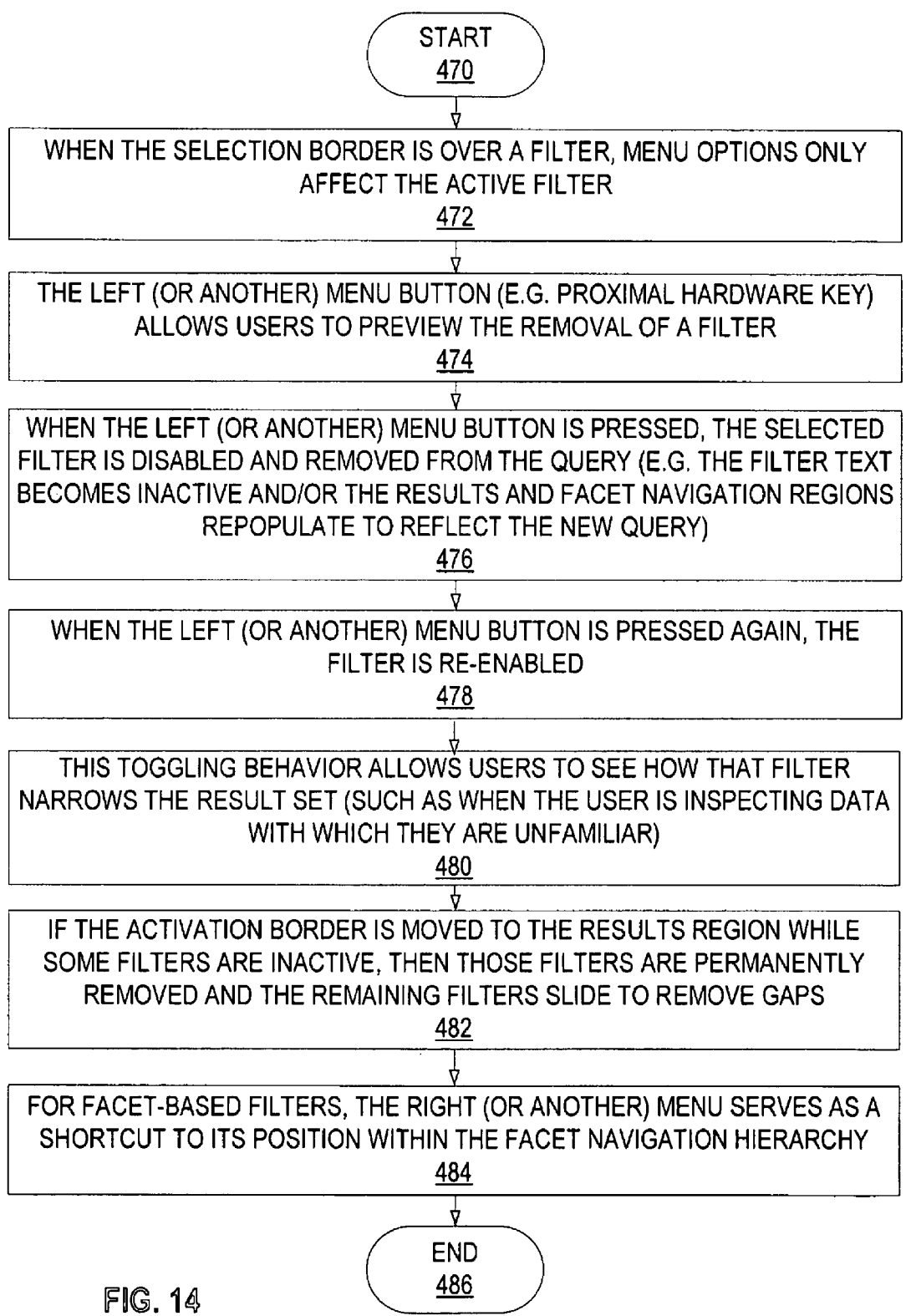
FIG. 14 is a process flow diagram for one implementation of the system of FIG. 1 illustrating the stages involved in interacting with the filter region to remove and re-enable filters.

FIG. 14 is a process flow diagram for one implementation of the system of FIG. 1 illustrating the stages involved in interacting with the filter region 244 to remove and re-enable filters. In one form, the process of FIG. 14 is at least partially implemented in the operating logic of computing device 100. The procedure begins at start point 470 with the selection border being over a filter, and the menu options thus only affecting the active filter (stage 472). The left (or another) menu button 252 allows users to preview the removal of a filter (stage 474). When the left (or another) menu button 252 is pressed, the selected filter is disabled and removed from the query (stage 476). In one implementation, the filter text becomes inactive and/or the results region 246 and facet navigation region 248 repopulate to reflect the new query (stage 476).

When the left (or another) menu button 252 is pressed again, the filter is re-enabled (stage 478). This toggling behavior allows users to see how that filter narrows the results set, such as when the user is inspecting data with which they are unfamiliar (stage 480). If the activation border is moved to the results region while some filters are inactive, then those filters are permanently removed and the remaining filters slide to remove gaps (stage 482). For facet-based filters, the right (or another) menu serves as a shortcut to its position within the facet navigation hierarchy (stage 484). The process ends at end point 486.

Figure 15:
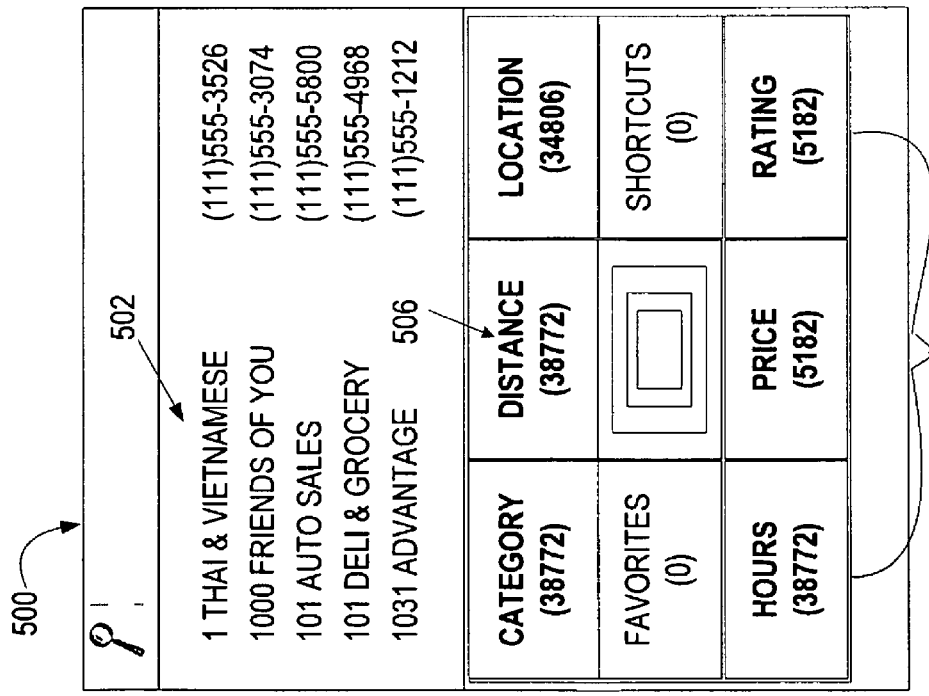
FIG. 15 is a simulated screen for one implementation of the system of FIG. 1 that illustrates various filter options displayed within the facet navigation area.

Turning now to FIGS. 15-24, several simulated screens are shown to illustrate the stages of FIGS. 4-14 in further detail. Simulated screens could be shown on a display 242 similar to the one of device 240 and/or computing device 100. These examples are illustrative only, and it will be appreciated that numerous other scenarios could also be used with the technologies and techniques discussed herein. FIG. 15 is a simulated screen 500 for one implementation of the system of FIG. 1 that illustrates various filter options 504 displayed within in the facet navigation area. In the example shown, facet navigation area 504 includes a three by three grid of filter options. Results window 502 contains a limited display of the current search results. Upon selecting a desired option, such as "distance" option 506 in the facet-based navigation region 504, the results are further filtered by the selected attribute, which in this case would be distance. In the example shown, each filter option contains a numerical identifier showing how many records have attribute values matching that filter.

Figure 16:
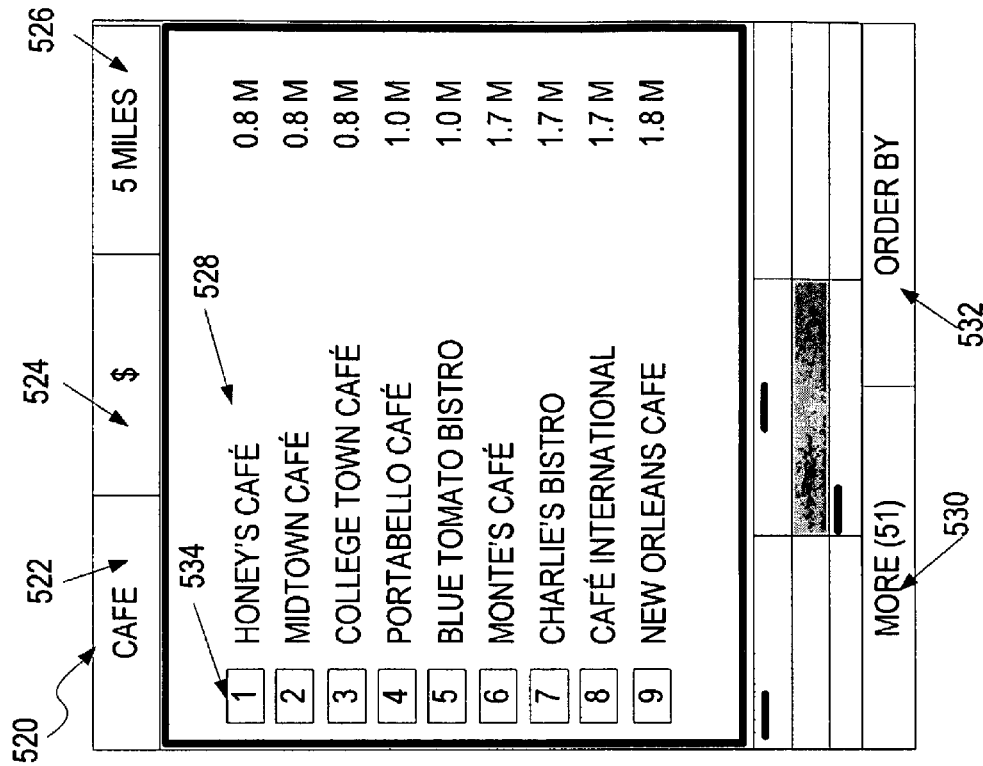
FIG. 16 is a simulated screen for one implementation of the system of FIG. 1 that illustrates a sample search with three filter criteria applied.

Turning now to FIG. 16, a simulated screen 520 for one implementation of the system of FIG. 1 illustrates a sample search with three facet-based filter criteria applied. The current search includes a business category ("café") filter 522, a price filter 524, and a distance filter 526. The results region 528 displays the data records that meet these three search criteria. The user can select a numeric value on the keypad or other input device that corresponds to a number 534 of a desired option to view additional details. The menu region currently displays two options. The first part of the menu region 530 displays the number of additional records that meet the specified criteria that did not fit in the results region 528. Upon selecting the left menu button 252 or another suitable button, the next set of these records can be displayed. The second part of the menu region 532 displays an "order by" option 532. The "order by" option is described in further detail in the discussion of FIG. 22.

Figure 17:
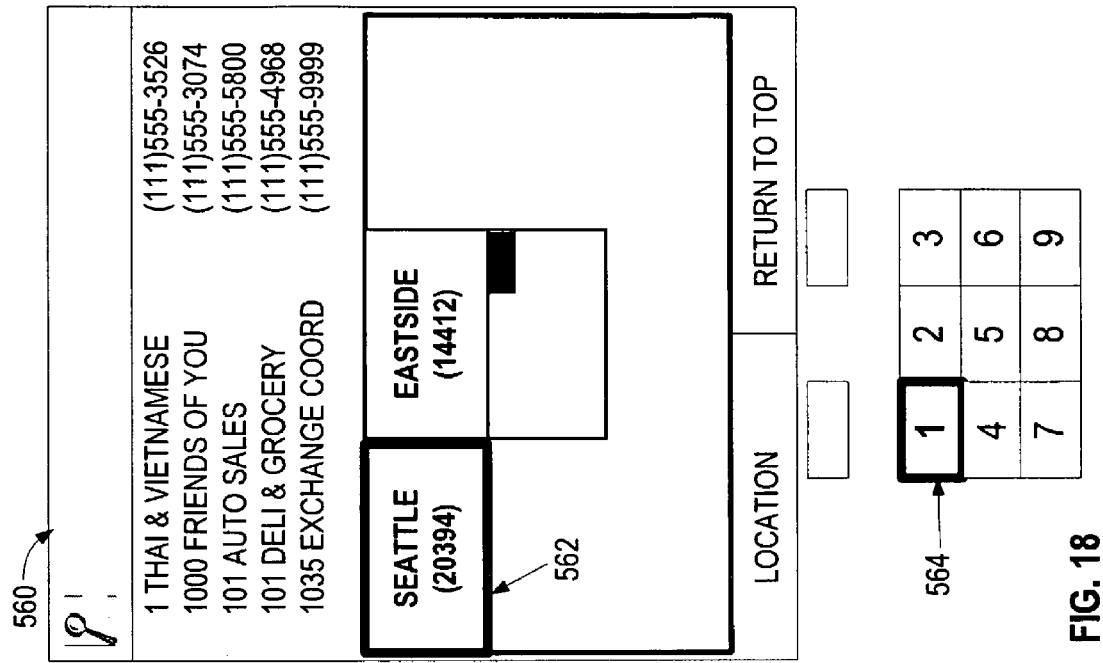
FIG. 17 is a simulated screen for one implementation of the system of FIG. 1 that illustrates selecting a number on a keypad that corresponds spatially with a location filter option displayed in the facet navigation area.
Figure 18:
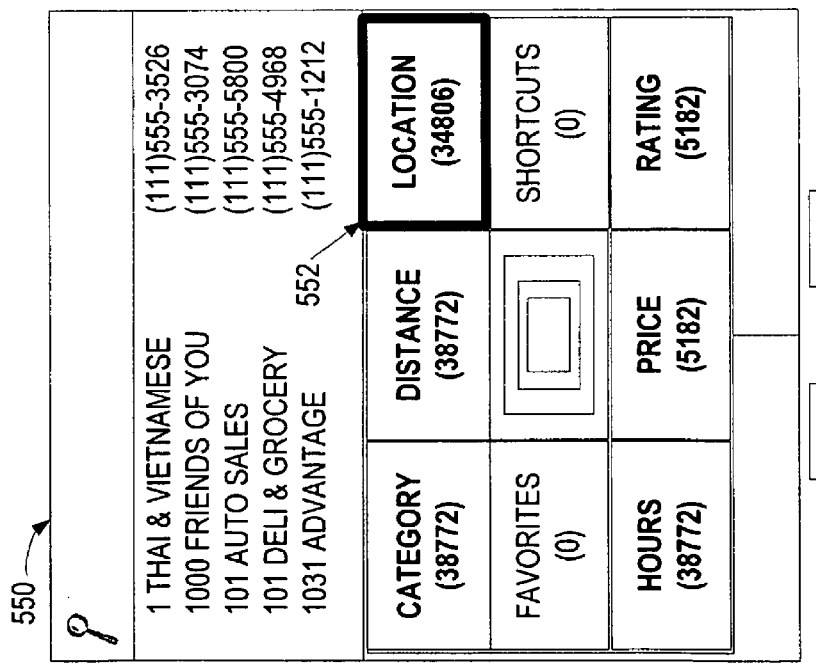
FIG. 18 is a simulated screen for one implementation of the system of FIG. 1 that illustrates selecting a number on a keypad that corresponds spatially with a city filter option displayed in the facet navigation area.

FIG. 17 is a simulated screen 550 for one implementation of the system of FIG. 1 that illustrates selecting a number on a keypad that corresponds spatially with a "location" filter option displayed in the facet navigation area. If the user wishes to apply the "location" filter 552, then the user presses the number 3 (554) on the keypad (254 on FIG. 3), since the number 3 (554) corresponds spatially in position to the "location" filter 552. Similarly, if the user wishes to further narrow the results and apply another filter, the user can select another filter option such as the one shown on simulated screen 560 of FIG. 18. If the user wishes to further limit the search results by city—which in this example is "Seattle" 562, then the user selects the corresponding number 1 (564) on the keypad. The facet navigation region displayed on FIG. 18 only contains a few active regions in the three by three grid because those are the only filters remaining at the present level in the search hierarchy.

FIG. 19 is a simulated screen 570 for one implementation of the system of FIG. 1 that illustrates further filtering, along with the history in the overview area. If the user wishes to apply a facet-based filter to the current data set that is associated with the "downtown" filter 572, then the user presses the number 4 (574) on the keypad. As with the previous examples, upon selecting this spatially corresponding option 574, the results region is updated based upon the filter. An overview area 576 is displayed in the center region of the facet navigation area. The first and second selections that the user made before navigating to the current data set are visually indicated. In other words, the first area 578 in overview area 576 represents the first selection made by the user, which was pressing the number 3 for "location" (as described in FIG. 17). The second area 577 represents the second (and more recent) selection made by the user, which was pressing the number 1 for "Seattle" (as described in FIG. 18). This graphical representation reminds the user how he/she navigated to the current data set and gives him/her a sense of location within the data set.

FIG. 20 is a simulated screen 580 for one implementation of the system of FIG. 1 that illustrates adding or removing a particular filter. Upon selecting the left menu button 582 that corresponds to the left menu area 584 containing the word "downtown", the filter is saved permanently in the filter region 586. Upon pressing the left menu button 582 again, the filter can be removed.

Figure 22:
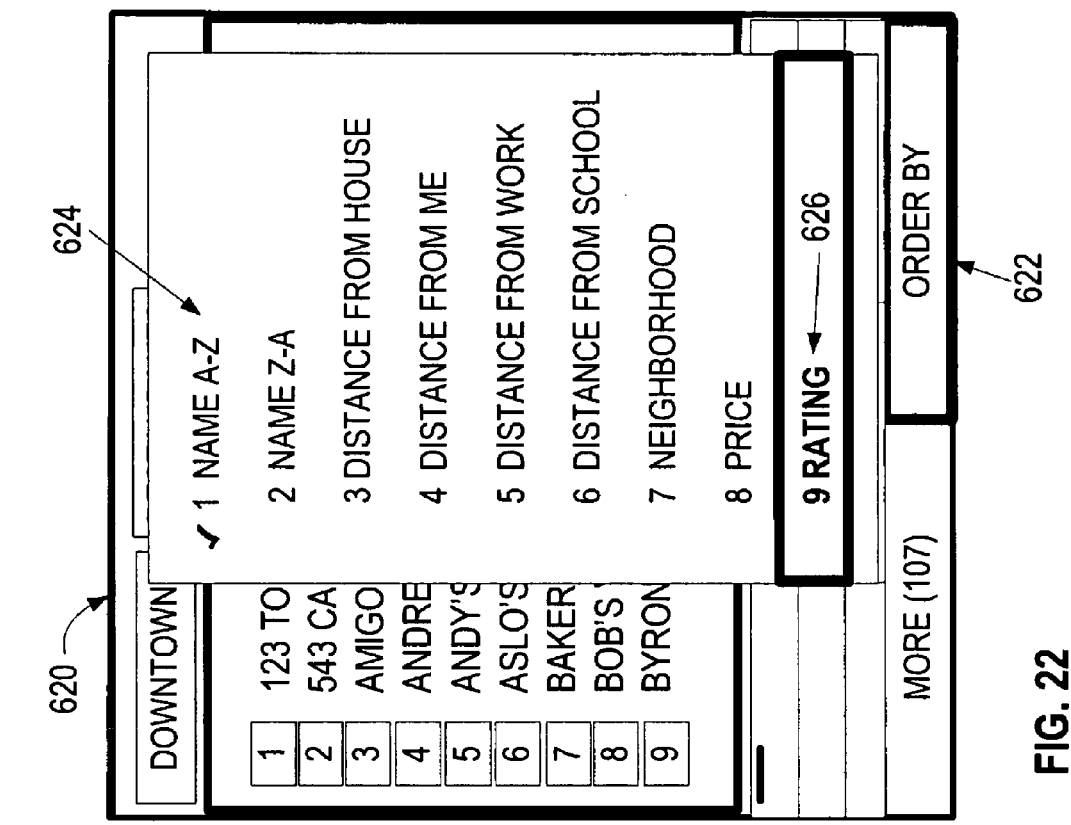
FIG. 22 is a simulated screen for one implementation of the system of FIG. 1 that illustrates modifying the order in which the data set is displayed in the active results region.
Figure 21:
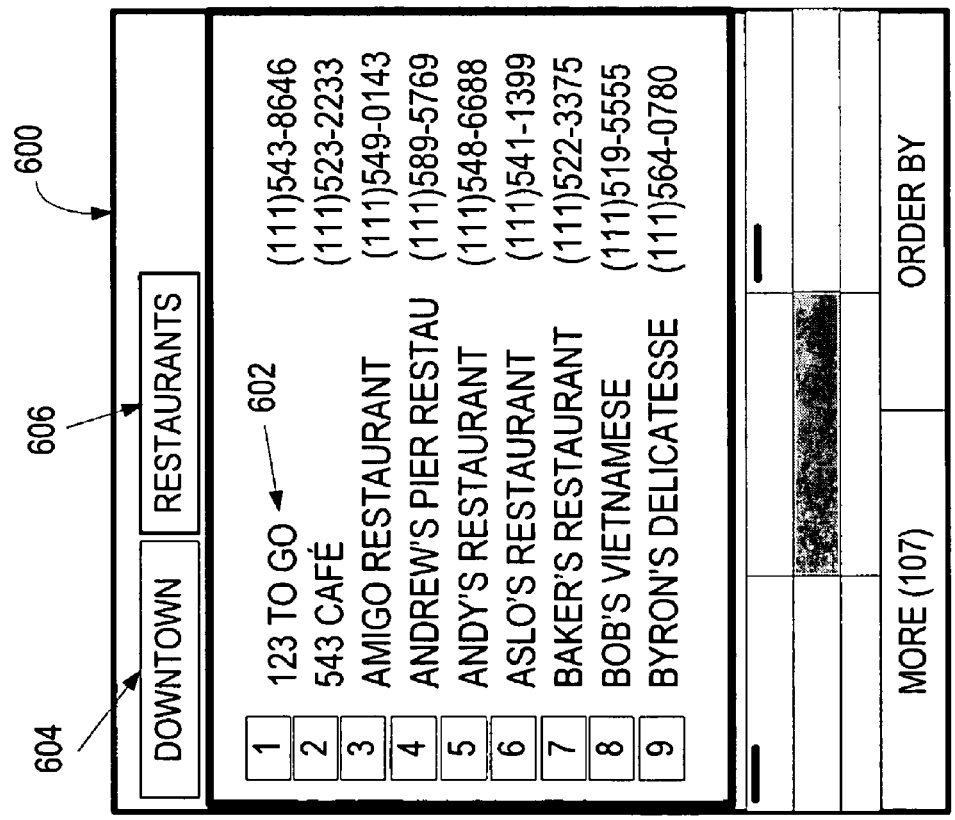
FIG. 21 is a simulated screen for one implementation of the system of FIG. 1 that illustrates interacting with the results region when it is active.

FIGS. 21-24 are examples of various ways to interact with the results region when it is the active region. FIG. 21 is a simulated screen 600 for one implementation of the system of FIG. 1 that illustrates viewing more records within the results region when it is active. Two filters are applied to the data set in simulated screen 600: "downtown" filter 604 and "restaurants" filter 606. These filters are displayed in the filter region. The results region 602 is currently the active region, as shown by the darker border around the area. The results region 602 has expanded to show more results that meet the specified search criteria, namely "downtown" 604 and "restaurants" 606. Simulated screen 620 of FIG. 22 illustrates modifying the order in which the data set records are displayed in the active results region. Upon selecting a menu button associated with "order by" option 622, a menu showing the current order 624 is displayed, along with the other available order options. Upon selecting a new order option, such as rating 626, the data set is updated to display the results in the selected order. In one implementation, rating 626 is selected by pressing the equivalent number, which in this case is 9, on the keypad of the device.

Figure 23:
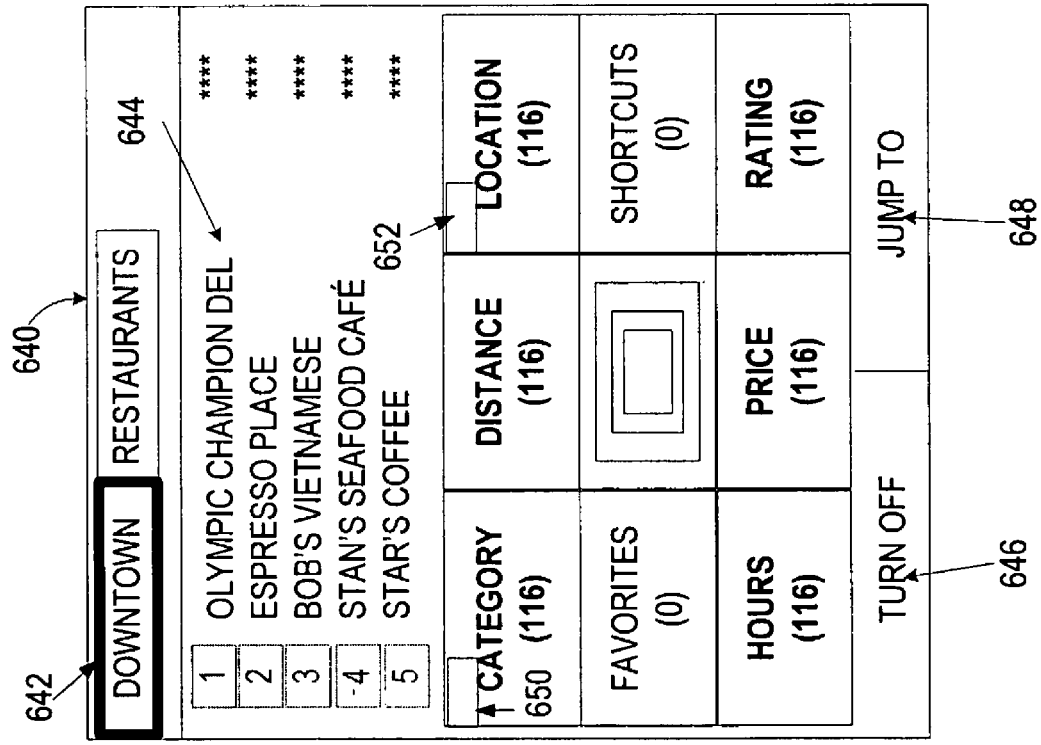
FIG. 23 is a simulated screen for one implementation of the system of FIG. 1 that illustrates moving the activation region to the filter bar.

FIG. 23 is a simulated screen 640 for one implementation of the system of FIG. 1 that illustrates moving the activation region to the filter bar. In the example shown, the "downtown" filter 642 is the currently active area. The results region 644 is shown in an inactive or less active state, such as grayed out or otherwise waiting further direction. Menu options "turn off" 646 and "jump to" 648 are displayed in the menu region (250 on FIG. 3). Upon selecting the "turn off" option 646, the "downtown" filter 642 is turned off. In one implementation, upon selecting the "jump to" option 648, an animated sequence of actions is taken that simulates the user backing out to the top level of the facet hierarchy and then navigating down to the "downtown" filter 642. In this case, the user is already at the top, so the animated sequence would be selecting an option corresponding to "location" (e.g. 3 on the keypad), an option corresponding to "Seattle" (e.g. 1), and an option corresponding to "downtown" (e.g. 4). The box 650 in the upper left corner of the "category" facet indicates that a filter has been set through its corresponding upper left (or 1) position. This is the "restaurant" filter. Likewise, the box 652 in the upper left corner of the location facet indicates that a filter has been set through its corresponding upper left (or 1) position. This is the "Seattle" filter region, which contains the "downtown" filter.

Figure 24:
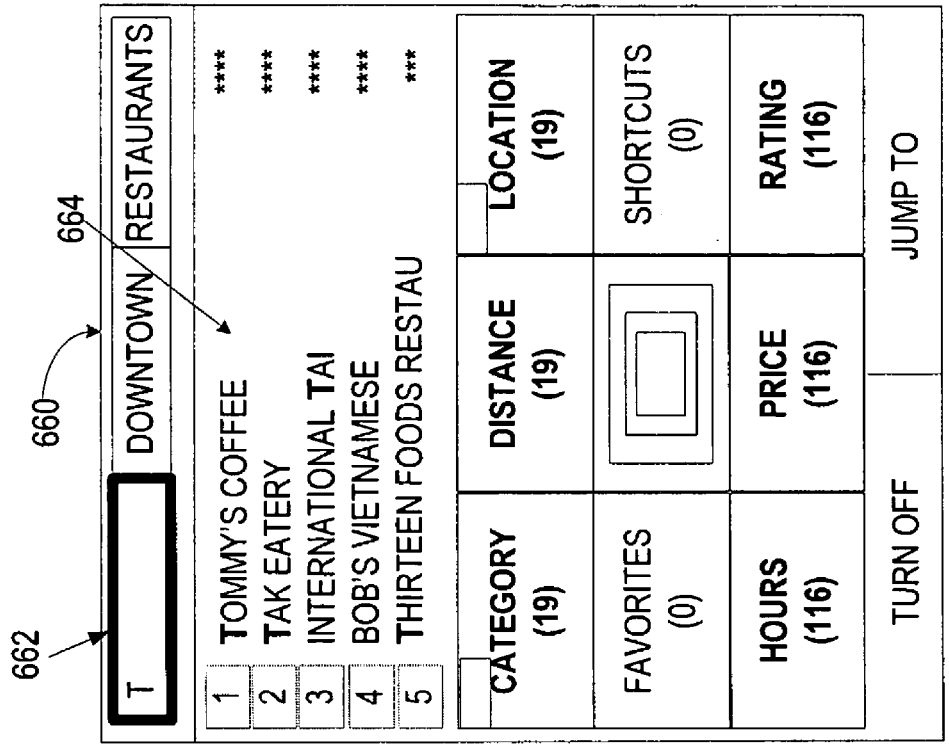
FIG. 24 is a simulated screen for one implementation of the system of FIG. 1 that illustrates performing a freeform text search.

FIG. 24 is a simulated screen 660 for one implementation of the system of FIG. 1 that illustrates performing a freeform text search. When the user navigates in the filter region to a new area, an empty box appears to allow the user to enter a freeform text query. In this example, the user has entered the letter "T" in the search box 662. The results region 664 is updated with results that match the freeform text value(s) entered by the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, menu buttons, and/or data layouts as described in the examples discussed herein could be organized differently on one or more computers to include fewer or additional options or features than as portrayed in the examples.

What is claimed is:

1. A method for searching for data comprising the steps of:
   organizing data records within each facet hierarchically with each data record reachable by one or more associated attribute values without requiring attribute values to have a unique classification;
   allowing a particular attribute value to be reached by multiple paths in the hierarchy;
   allowing each data record to be found by any of the one or more associated attribute values;
   receiving input from a user to apply a facet-based filter to the data records by selecting a number on a keypad of a mobile device that correlates spatially to a filter option displayed in a facet navigation region;
   combining attribute-based filtering of the facet-based filter with incremental text entry to display results with the results updated after each character entry;
   receiving selection of a save input option from the user to save the facet-based filter; and
   displaying an attribute label for the saved facet-based filter in a filter region.

2. The method of claim 1, wherein the facet navigation region comprises a three by three grid that correlates spatially to a series of numbers from one to nine on the keypad.

3. The method of claim 1, wherein upon selection of the save input option a second time, the saved facet-based filter is removed.

4. The method of claim 1, wherein the save input option is selected by pressing a menu button on the mobile device.

5. A tangible computer storage medium having computer-executable instructions for causing a computer to perform steps comprising:
   organizing data records within each facet hierarchically with each data record reachable by one or more associated attribute values without requiring attribute values to have a unique classification;
   allowing a particular attribute value to be reached by multiple paths in the hierarchy;
   allowing each data record to be found by any of the one or more associated attribute values;
   receiving input from a user to apply a facet-based filter to the data records by selecting a number on a keypad of a mobile device that correlates spatially to a filter option displayed in a facet navigation region;
   combining attribute-based filtering of the facet-based filter with incremental text entry to display results with the results updated after each character entry;
   receiving selection of a save input option from the user to save the facet-based filter; and
   displaying an attribute label for the saved facet-based filter in a filter region.

6. The computer storage medium of claim 5, wherein the facet navigation region comprises a three by three grid that correlates spatially to a series of numbers from one to nine on the keypad.

7. The computer storage medium of claim 5, wherein upon selection of the save input option a second time, the saved facet-based filter is removed.

8. The computer storage medium of claim 5, wherein the save input option is selected by pressing a menu button on the mobile device.

9. A method for searching for data comprising the steps of:
   organizing data records within each facet hierarchically with each data record reachable by one or more associated attribute values without requiring attribute values to have a unique classification;
   allowing a particular attribute value to be reached by multiple paths in the hierarchy;
   allowing each data record to be found by any of the one or more associated attribute values;
   receiving a selection from a user to navigate to a particular zone of data described in a facet navigation region on a mobile device, the selection comprising a press of a number on a keypad that correlates spatially to the particular zone in the facet navigation region, the facet navigation region displaying a set of data based on an applied facet-based filter;
   combining attribute-based filtering of the facet-based filter based on the selected zone with incremental text entry to display results within a results regions with the results updated after each character entry;
   updating an overview area in the facet navigation region with a history value to graphically illustrate how the user navigated to the current set of data;
   receiving selection of a save input option from the user to save the facet-based filter; and
   displaying an attribute label for the saved facet-based filter in a filter region.

10. The method of claim 9, wherein the overview area is contained in a center portion of the facet navigation region.

11. The method of claim 9, wherein the results region serves as a query preview.

12. A computer storage medium having computer-executable instructions for causing a computer to perform the steps recited in claim 9.

* * * * *